United States Patent [19]

Anquetin

[11] Patent Number: 5,380,135
[45] Date of Patent: Jan. 10, 1995

[54] UNIVERSAL PLUG

[75] Inventor: Robert P. Anquetin, Etrechy, France

[73] Assignee: Black & Decker Inc., Newark, Del.

[21] Appl. No.: 26,725

[22] Filed: Mar. 5, 1993

[30] Foreign Application Priority Data

Mar. 10, 1992 [GB] United Kingdom ............... 9205192
Mar. 16, 1992 [GB] United Kingdom ............... 9205693

[51] Int. Cl.$^6$ ..................... F16B 13/04; F16B 13/06
[52] U.S. Cl. ............................. 411/38; 411/59; 411/908
[58] Field of Search .............. 411/34, 36, 37, 38, 411/55, 59, 908

[56] References Cited

U.S. PATENT DOCUMENTS

| 4,789,285 | 12/1988 | Fischer | 411/34 X |
| 5,205,688 | 4/1993 | Sundstrom | 411/59 X |
| 5,312,215 | 5/1994 | Anquetin | 411/38 |

Primary Examiner—Neill R. Wilson
Attorney, Agent, or Firm—Charles E. Yocum; John D. Del Ponti; Dennis A. Dearing

[57] ABSTRACT

A plug is suitable for use in preformed blind holes in rigid and soft material and also holes in sheetform material.

The plug comprises a head portion (2) joined to a tail portion (10) by four legs (12), all having flexing points (20, 22, 24) towards their ends and in a central portion.

The tail portion has a thread formation (16, 18) formed by a moulding process.

5 Claims, 5 Drawing Sheets

UNIVERSAL PLUG

BACKGROUND OF THE INVENTION

This invention is concerned with plugs for use in securing a screw in a previously formed hole in a work piece.

Plastics plugs, which are inserted into a hole in a work piece, to receive a conventional screw to secure the screw to the work piece are well known.

It is usual to use different plastics plugs for different work pieces; in particular, for securing screws into a blind hole in a hard work piece, such as brick or concrete; into a blind hole in a soft friable work piece, such as blown concrete; or, into a hole extending right through a sheetform work piece.

Attempts have been made to provide a plug which is suitable for use in all these three situations, but the requirements for a fastener to work satisfactorily in all three conflict with one another.

For a plug which is to secure a screw in a hole in a rigid work piece, the plug is conventionally of uniform outside diameter so that it may readily be inserted in the hole. A central bore, to receive the screw is usually provided with ridges so that on the screw being driven into the plug the screw engages the plug firmly, and a small amount of expansion of the plug takes place to grip the hole firmly. Use of such a plug in a friable material will usually not provide a firm fixture as the expansion of the plug is inadequate to hold the plug securely in the material.

For a plug which is to secure a screw in a hole through a sheetform material, the plug usually comprises a tail portion connected to a head portion of the plug by a series of legs, and the screw is intended to pass freely through the bore of the plug until it reaches the tail portion, and then to draw the tail portion towards the head portion to force the legs to bend outwardly to secure the plug to the work piece. It will be realized that the provision of ridges in the bore of the plug (to enable the plug to be used, as above, in rigid material) will prevent easy passage of the screw from the head portion to the tail portion.

Moreover, where the plug is constructed from plastics material it is difficult and generally not cost effective to form a thread in the bore of the tail portion which would assist passage of the screw. Thus, in plastics plugs, the screw normally cuts its own thread and of course this offers considerable resistance to the turning of the screw. The screw can therefore impose a severe torque on the tail portion while it is being driven. This torque can be sufficient to twist the legs and indeed this is the intended result in some plugs presently available, so that the legs twist around the screw and, as the screw draws the tail portion towards the head portion the legs are squeezed into a ball formation. However, this places very localised pressures around the edge of the hole in the sheetform material so that where the latter is plaster board or the like the edge may crumble and prevent a secure fixing being made.

In WO/9008265, there is disclosed a plug where this tendency of the legs to twist is countered. This plug comprises a head portion having an enlarged flange adapted to engage the work piece and a generally cylindrical portion, tapering outwards slightly from the flange, a cylindrical tail portion of substantially the same diameter as the smallest part of the head portion and four legs interconnecting the tail portion and the head portion.

These legs are in two pairs, one pair of opposed legs of approximately a semicircular cross section, and another pair of opposed legs of somewhat smaller cross section. The larger legs are arranged such that twisting of them is substantially prevented, and only folding at defined weakened positions is essentially possible.

This plug will operate successfully in a hole in rigid material, and will also operate in a hole in sheetform material of appropriate thickness, where the legs will fold outwards near their middles so that the halves of the legs connected to the head portion are levered flat against the back of the sheetform work piece as the tail portion is drawn towards the head portion on driving of the screw into the tail portion. A secure fixing, even in friable material such as plasterboard, is therefore possible because the pressures on the board are spread by the legs being flat against the board, and are not concentrated on the edge of the hole.

Even so, the screw having to cut its own thread in the tail portion (despite the provision of ridges in the tail portion to reduce the requisite torque required) nevertheless makes the plug difficult to set and offers considerable resistance to driving of the screw. Indeed, although the aforementioned ridges do reduce the torque required, this reduction is at the expense of the security of the fixing; it is quite possible to overdrive the screw without appreciating that in so doing the threads painstakingly cut in the tail portion have now been stripped.

However, it is in soft friable material where the plug will not generally operate satisfactorily: the plug will not expand adequately into the friable material simply on insertion of a screw into the plug, and if the screw is driven further, the rigidity of the larger pair of the legs is such that only a small amount of lateral expansion, in a manner comparable to that taking place when used with sheet material, will take place, and a secure fastening cannot be ensured. In this context, the aforementioned twisting of the legs into a ball is desirable as it expands into the friable material.

A solution to this problem is to make the legs essentially the same so that twisting is possible, but provide threads in the tail portion so that less torque is required to drive the screw into the tail portion (but without reducing the strength of the connection between the screw and tail portion) so that the undesirable ball formation does not occur, or is not so likely to occur, when the plug is used in the sheetform work piece situation.

However, while there is little problem in forming threads in plugs of this type, it is a different matter to do so in a cost effective manner.

U.S. Pat. No. 4,547,108 discloses a trim cover clip which has a thread grip moulded on an internal flexible tongue formed in a bore of the clip. Here a core mould passes through a window of the clip. However, the thread so-formed is only single sided and in order to grip a screw must be biassed towards the screw and accordingly offers significant resistance to entry of the screw.

It is an object of the present invention to provide a plug of plastics material having moulded thread formations, and a method of moulding same which does not suffer the aforementioned disadvantages, or at least mitigates their effects.

SUMMARY OF THE INVENTION

In accordance with this invention there is provided a plug for use in securing a screw in a previously formed hole in a work piece comprising a head portion having an enlarged flange adapted to engage the work piece, a tail portion of substantially the same external diameter as the head portion, and legs interconnecting the tail portion and the head portion, wherein the tail portion comprises a body having a central bore from a leg end to an opposite open end, said leg end being connected to said legs, a first helical land of at most one turn being formed in said bore near said leg end, a second helical land of at most one turn being formed in said bore near said open end, each helical land having a start and an end, being in a first plane containing a central longitudinal axis of the plug, inclined arcuate grooves being formed in said bore between said lands, and two openings in either side of said cylindrical portion connecting with said bore, each opening having a first side coincident with said plane and a second parallel side on opposite sides of said plane, a second plane being defined by said axis and lying perpendicular said first plane, said second sides of each opening each having a profile the same as the profile in said second plane of said grooves in the bore, said helical lands and said arcuate grooves constituting a thread formation such that a screw of appropriate dimensions can drive through said formation substantially without cutting the material of the plug.

The invention further provides a method of moulding a plug employing a mould in two mating parts, defining first and second perpendicular planes, each part having a head forming portion, a tail forming portion and a legs forming portion between said head and tail forming portions, the two parts mating along said second plane which contains a longitudinal axis of said plug when moulded, said first plane also containing said axis, the mould further comprising a bore pin and an end pin, the pins lying along said axis and each having an end facing the other, each pin being substantially cylindrical and having a helical land former at said facing end, each former having a start and a finish lying in said first plane and being within the confines of the tail forming portion of said mating parts when the mould is assembled, a peg being disposed in each tail forming portion of each mating part of the mould, each peg having a root end attached to said mating part and a distal end, and a first surface extending between said root to said distal ends and being in said first plane, the ends of said first surfaces being adapted to lie against each other when the mould is assembled and said pins being adapted to abut said pegs such that a continuous bore is formed in said plug during moulding, said pegs being grooved on a second surface thereof, first of said grooves being substantially parallel said first plane from the root end of the plug until said second plane is reached whereupon said grooves change to second of said grooves being substantially parallel said second plane, said method comprising the steps of:

a) assembling said mould;
b) injecting material in said mould to fill its cavities;
c) allowing said material to harden;
d) opening said mould by moving said mating parts away from said bore pin in the direction of said first grooves;
e) moving said end pin in said axial direction to release the plug from the bore pin, whereby a plug is formed having a thread formation in a tail portion thereof such that a screw of appropriate dimensions can be driven through said tail portion substantially without cutting the material of the plug.

In another aspect, the invention provides a method of forming a wall plug having a screw thread in its end by employing a mould comprising two mating parts defining a longitudinal axis and first and second perpendicular planes each containing said axis said parts mating in said second plane and including pegs having a first surface in said first plane and second surfaces in parallel planes on either side of said first plane, said second surfaces being curved at a distal end of each peg to join said first surfaces and being grooved so as to form said screw thread in the wall plug moulded in said mould.

Preferably the pegs are each inclined with respect to a third plane perpendicular said first and second axes by an amount equal to the inclination of the screw thread to be formed. Preferably, the grooves on said second surface are parallel the peg in the region where said second surface is parallel said first plane but are progressively inclined on said second surface so that a tangent to said grooves remains inclined with respect to said third plane by the same inclination around said curved region of said second surface.

The invention also provides a mould for performing the aforementioned method.

The invention is further described hereinafter, by way of example only, with reference to the accompanying drawings.

DESCRIPTION OF PREFERRED EMBODIMENTS

Figure 1:
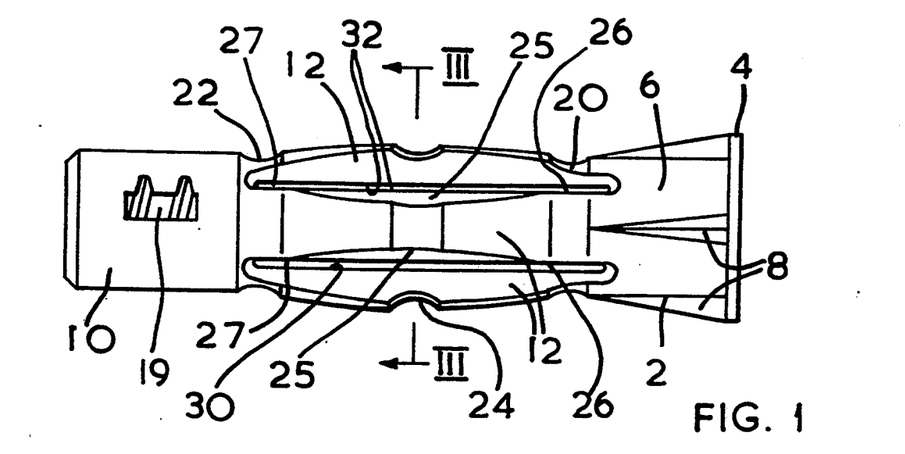
FIG. 1 shows a side view of a plug embodying the invention.

A plug embodying the invention is shown in FIG. 1. This plug is made of nylon, preferably Nylon 6-6. As will be explained later, the plug is usable in three different modes to secure screws in a previously formed hole in a work piece.

The plug comprises a head portion 2 which has an enlarged flange 4 adapted to engage the surface of the work piece in the use of the plug. The head portion 2 comprises a cylindrical portion 6 of uniform outside diameter. Four ribs 8 extend from the portion 6 to the flange 4 to assist in preventing rotation of the plug when inserted into a work piece.

The plug also comprises a cylindrical tail portion 10 of substantially the same external diameter as the head portion. Four legs 12 interconnect the tail portion 10 and the head portion 2.

Figure 2:
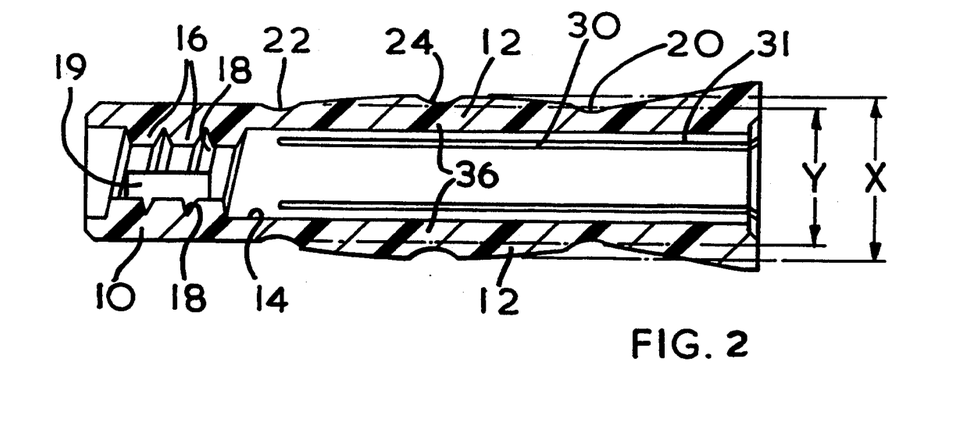
FIG. 2 shows a view of the plug in longitudinal section.

A substantially uniform smooth bore 14 extends through the head portion 2 and the four legs 12 to the tail portion 10. The tail portion 10 is provided with screw engaging projections in the form of thread shaped lands 16 which have a central bore of lesser diameter than the bore 14, but the diameter of the bottom of generally helical recesses 18 between the lands 16 is approximately the same as that of the bore 14. Thus, between them the lands 16 and grooves 18, described in more detail below, constitute a thread formation 16, 18.

Each leg 12 comprises a first flexing portion 20 of reduced thickness adjacent the cylindrical portion 6 of the head portion, a second flexing portion 22 of reduced thickness adjacent the tail portion 10, and a third flexing portion 24 of reduced thickness approximately midway between the flexing portions 20 and 22. The thickness of the leg (see FIG. 2) radially of the plug increases from the first flexing portion 20 towards the third flexing portion 24, and from the second flexing portion 22 towards the third flexing portion 24. It can thus be seen that the overall outer diameter X of a central portion of the four legs is slightly greater than the outer diameter Y of the cylindrical portion 6 of the head portion 2.

Figure 3:
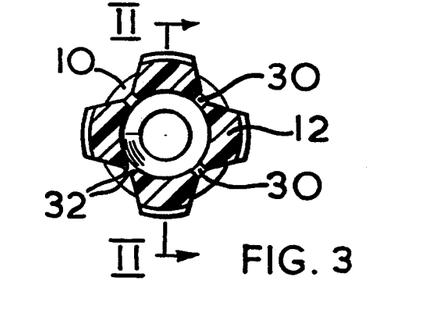
FIG. 3 shows a view in section along the line III—III of FIG. 1.

Each leg 12, viewed perpendicular to a plane of symmetry of the plug generally perpendicular to the leg, comprises bowed side faces 25, 25. Extending from the bowed side faces 25, 25 to the head portion 2 are parallel side faces 26, 26, and from the bowed side faces 25, 25 to the tail portion 10 are parallel side faces 27, 27. Thus the thickness of the leg transversely of the radial direction decreases between the first flexing portion 20 and the third flexing portion 24, and between the second flexing portion 22 and the third flexing portion 24. A small gap 30, of generally uniform width, extends between inner edges 32 of adjacent side faces of two legs 12. This gap 30 extends from the second flexing portion 22 past the first flexing portion 24 and a short way into the cylindrical portion 6 of the head portion 2. The head portion 2 is provided with four equally spaced internal axial grooves 31 which are continuations of the gaps 30.

The plug may be utilized in three different modes.

In a first mode (FIGS. 4 and 5) the plug is used in a blind hole in fairly strong material, e.g. brick. A hole 34 is prepared which is approximately of the size of the cylindrical head portion 6 of the plug. The plug is then inserted in the hole. It will enter the hole easily, central portions of the four legs being pushed inwardly (with slight flexing at the three flexing portions of each leg) and inward portions 36 of each leg moving into the central bore 14 to provide a portion of reduced diameter in the bore, this diameter decreasing from the head portion 2 to the middle of the legs 12, and then increasing again from the middle portion to the tail portion 10. A screw 38 is then inserted. The screw is of appropriate diameter to engage the legs 12 where they have been forced inwardly. Depending on the nature of the material of the work piece, the legs 12 may be forced outwardly by the screw, enlarging the hole 34, but in most materials the legs will serene to grip the screw 38 tightly and also the inner surface of the hole 24.

Figure 4:
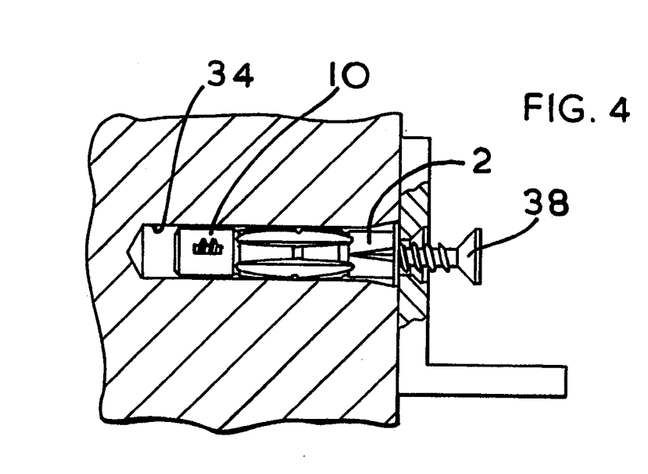
FIGS. 4 & 5 show a first mode of use of the plug.
Figure 5:
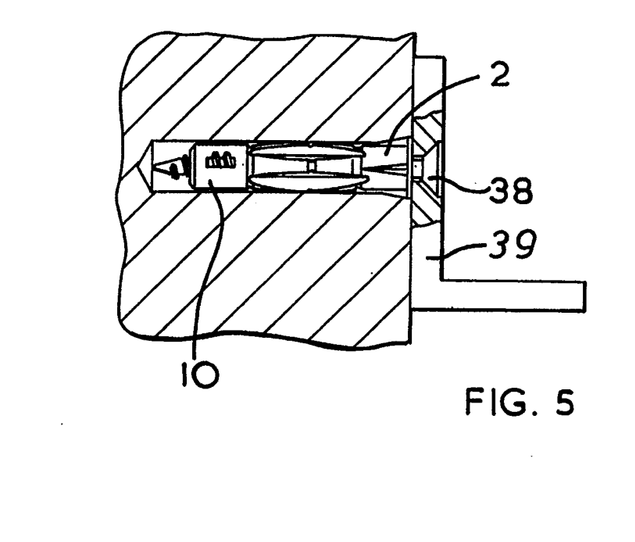

When the point of the screw 28 reaches the tail portion 10 of the plug it engages the thread formation 16, 18. If the plug is a close fit in the hole 34, the screw will be driven through the tail portion 10, thus serving to increase the grip of the plug both on the screw 38 and the hole 34. Should the hole be somewhat oversize for the plug, the screw will, on continued driving thereof after is head 38 has engaged the element 39 being fixed, strip the threads it has cut (if any) in the surfaces 36 and draw the tail portion 10 towards the head portion 2, thus to expand the legs 12 somewhat to improve the grip within the hole.

In a second mode of utilization of the plug, the plug is used in a hole which extends through material 41 of a thickness less than the plug.

Figure 6:
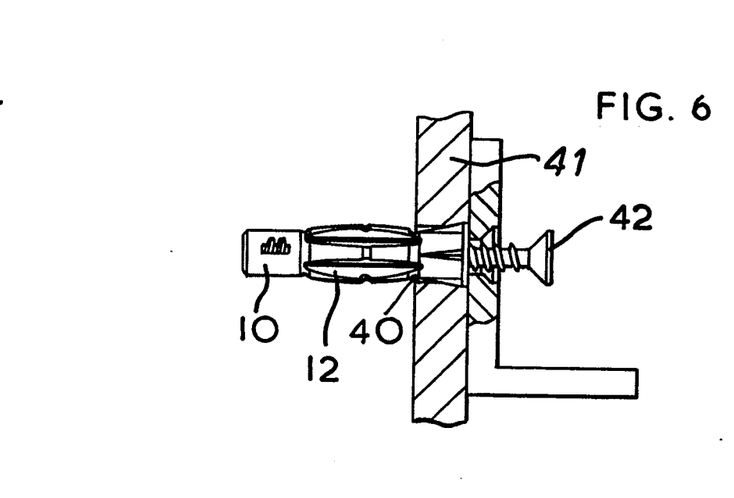
FIGS. 6 & 7 show a second mode of use of the plug.

As shown in FIG. 6, the material 41 is of a thickness approximately equal to the length of the head portion 2. A hole 40 is prepared which is approximately the size of the cylindrical head portion of the plug. The legs 12 will flex inwardly as the plug is pushed through the hole 40 and will then reassert themselves on the other side of the work piece.

Figure 7:
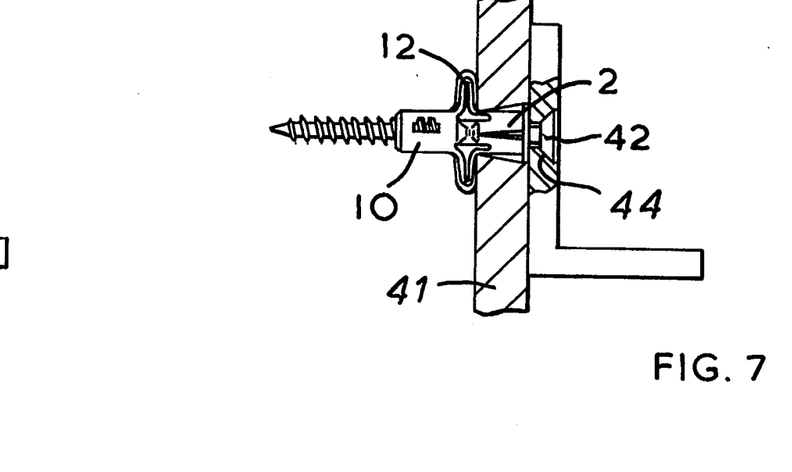

A screw 42 is then inserted. It is able to pass along the uniform bore 14 with very little effort, engagement between the screw 42 and the bore being minimal. When the point of the screw 42 reaches the tail portion 10 of the plug it engages the thread formation 16, 18 and further turns of the screw, when the head 44 of the screw is not capable of further movement towards the work piece, will cause the tail portion 10 to be drawn towards the head portion 2 and the legs 12 bow outwards, flexing at the three flexing portions. The final position of the plug is as shown in FIG. 7, with the legs 12 flexed into a tight U shape and abutting against the inner face of the work piece material 41.

In this position, the cruciform arrangement of legs 12 spreads the loads imposed on the material 41 by the tightening of the screw 42. These loads are not concentrated on the edges of the hole 40. However, such a position is only achieved because the thread formation 6, 18 offers only slight resistance, while still giving a strong connection, to the screw 42 of corresponding pitch and other dimensions. Without the thread formation, the screw 42 would have to cut its own thread and the torque this would impose on the tail portion 10 may be quite sufficient to twist the legs 12 so that they ultimately curl up into a ball. This does impose localized loads on the edge of the hole 40. Indeed it is likely to happen anyway if a screw of the wrong dimensions is employed, although, even then, it is less likely to happen than if the thread formation 16, 18 was entirely absent.

Figure 8:
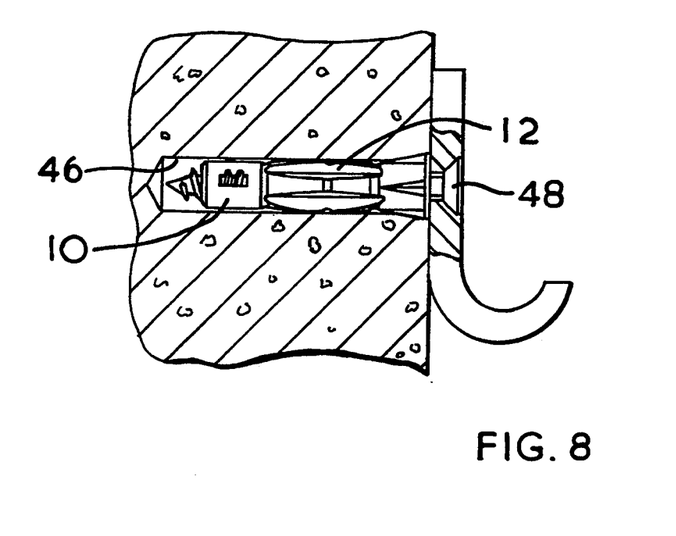
FIGS. 8 & 9 show a third mode of use of the plug.

In the third mode (FIGS. 8 & 9) the plug is used to secure a screw in a blind hole in a work piece of soft or friable material.

Figure 9:
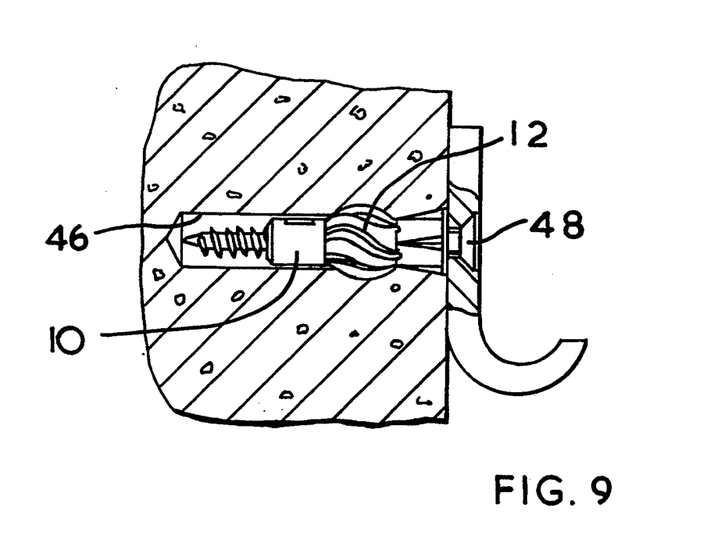
Figure 10:
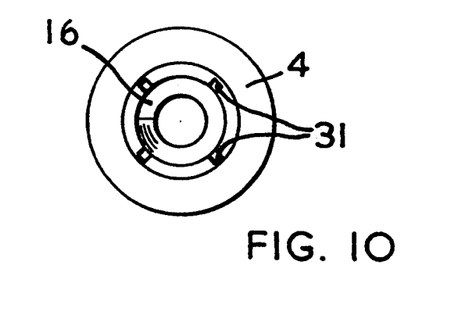
FIG. 10 shows an end view of a head portion of the plug.

A hole 46 of approximately the size of the cylindrical head portion is prepared and the plug is inserted in the hole. A screw 48 is then inserted. While the legs 12 will have been, to some extent, pushed inwardly by insertion into the hole 46, the nature of the material is such that the screw can readily be pushed through the plug (pushing the legs 12 outwardly into the soft material, until the screw engages the thread formation 16, 18 of the tail portion 10. Generally, further driving of the screw 48 will cause the screw to enter into the tail portion 10. The legs 12 will attempt to flex as they do in sheet material (as described above with reference to FIGS. 6 and 7), but the wall of the bore prevents this. However, as the screw 48 tightens, it will begin instead to rotate the tail portion 10, thus bending the legs 12 into somewhat of an S shape. Further rotation of the screw 48 will cause the tail portion 10 to be drawn towards the head portion 2 with an outwards bowing of the legs 12, thus to assume a bulging configuration as shown in FIG. 9. It will be understood that the actual configuration of the plug when the screw 48 is firmly secured will be to some extent dependent on the nature of the material of the work piece and on the precise diameter of the hole 46.

The construction of the legs 12 contribute towards the ability of the plug to assume the shape shown in FIG. 9. Firstly, the four legs 12 are all of the same construction, so they all tend to deform in the same way. Secondly, while each leg is increasing in radial thickness from its outer portions towards its middle, the bowed side faces 25 reduce the transverse thickness of the leg, and thus the leg has substantially the same ability to flex along its length. Further, the configuration of the gaps 30 between the legs and the adjacent surfaces 25, 26, 27 of two adjoining legs have the effect that there is no interference between the legs which might reduce the ability of the legs to twist. In fact, these very features which encourage the bulging configuration in this soft material, and where twisting and bulging of the legs 12 has a beneficial effect, would also of course likewise encourage this bulging effect in sheetform work piece application as described above with reference to FIGS. 6 and 7, and in which arrangement the twisting and bulging of the legs 12 has a detrimental effect.

It is primarily for this reason that the thread formation 16, 18 is provided in the tail portion 10. However, to specially cut threads in the tail in a separate operation after the plugs have been moulded, or even to mould the threads in the plug on a helical die and thereby requiring the plug to be spun off the die after moulding, would in either case be prohibitively expensive.

Thus the thread formation 16, 18 is formed as part of the moulding operation of the plug itself and in such a manner that no subsequent operations are required after moulding is complete.

Figure 11:
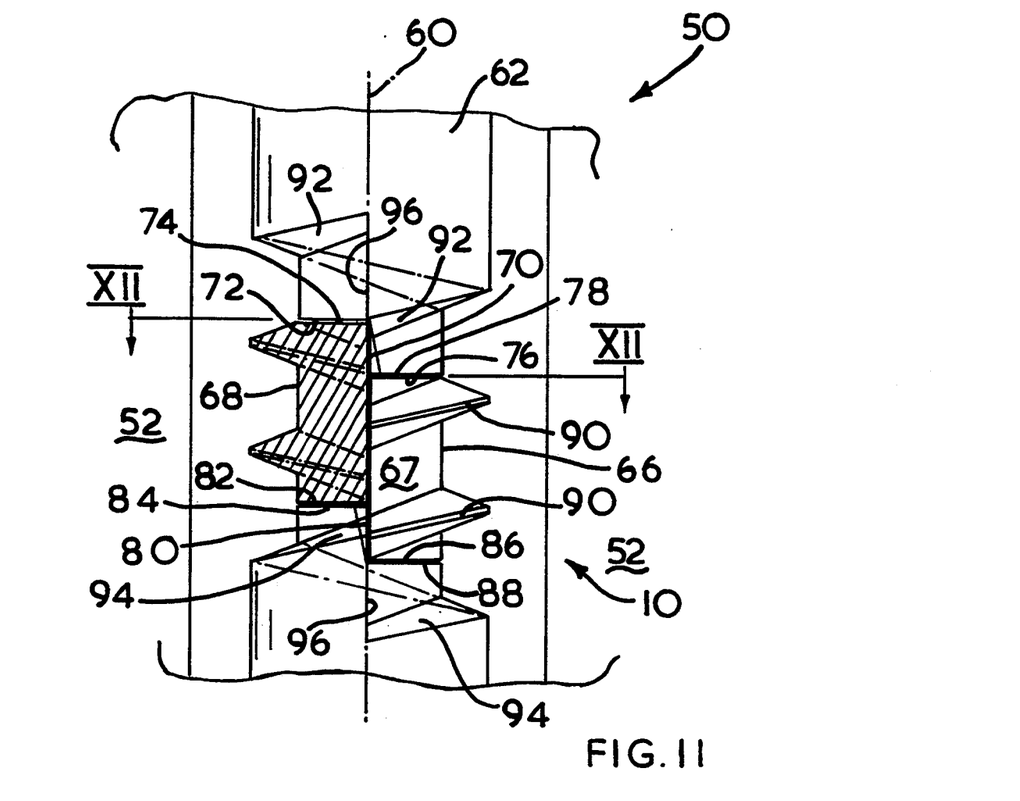
FIG. 11 is a side view in the direction of the arrow XI in FIG. 12 of an assembled mould according to the present invention.
Figure 12:
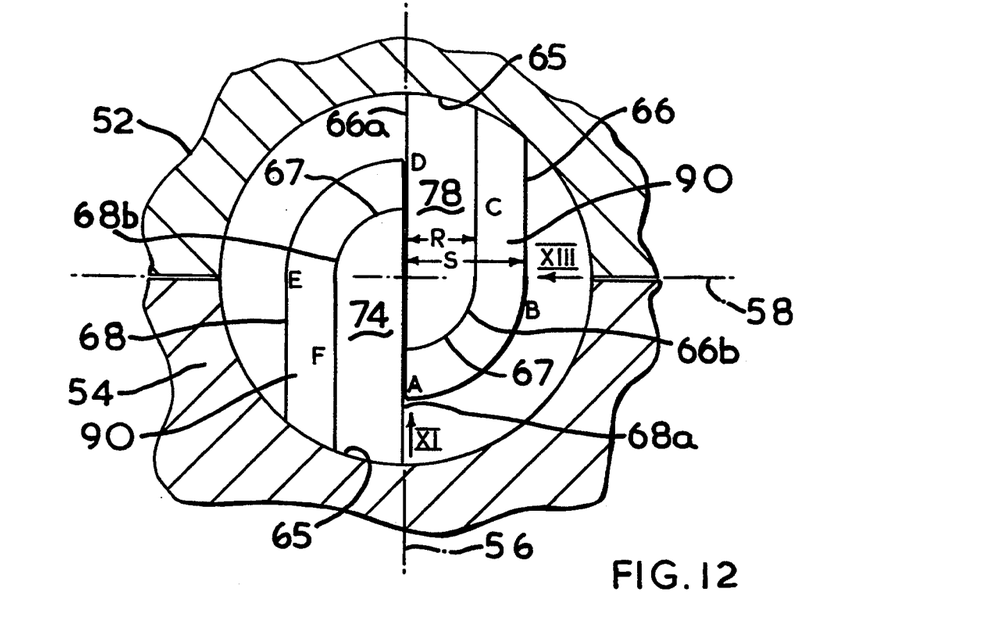
FIG. 12 is a plan view of the mould of FIG. 11 taken along the line XII—XII in FIG. 11; and, FIG. 13 is another side view of the mould of FIG. 11 in the direction of the arrow XIII in FIG. 12.
Figure 13:
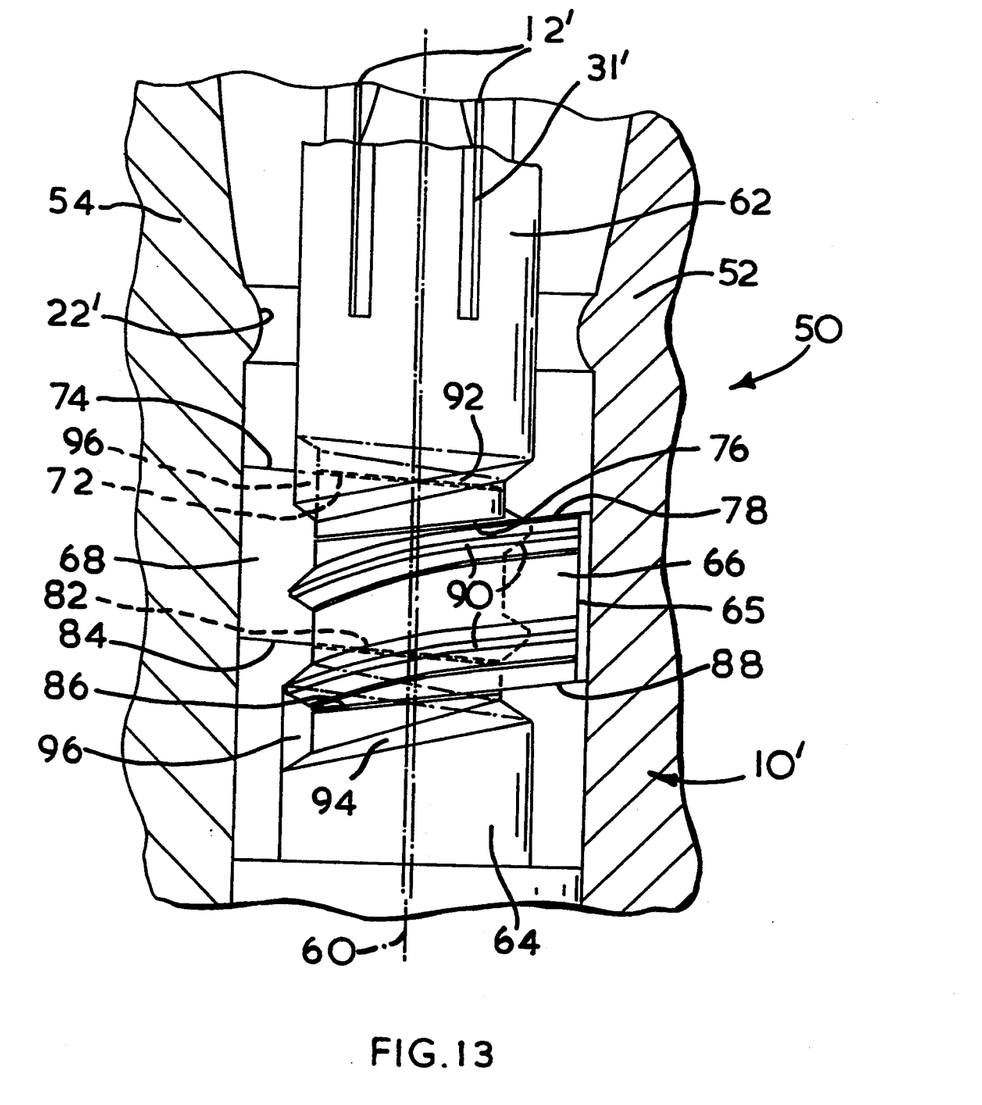

FIGS. 11, 12 and 13 show the relevant parts of a mould 50. The mould 50 comprises two mating parts 52, 54 which are shell like and form the outside profile of the plug. They define two perpendicular planes 56, 58, first plane 56 being perpendicular to second plane 58, and both intersecting along longitudinal axis 60 of the mould 50 and final plug. FIG. 11 is in the second plane 58 while FIG. 13 is in the first plane.

Each mould part 52, 54 obviously has the appropriate profile to mould the parts of the plug described with reference to FIGS. 1 to 10. Thus it has a tail forming portion 10', the main subject of FIGS. 11 to 13. However in FIG. 13, the mould parts 52, 54 can be seen to have raised rib 22' to form the second flexing portion 22, and longitudinal ribs 12' which between them form the legs 12.

The mould further comprises cylindrical pins inserted in the mould parts 50, 52 from above and below. Bore pin 62 is inserted from above and forms the bore 14 of the plug. For this purpose it has ledges 31' which bear against ribs 12' to form the slots 30 between the legs 12, and in the head portion 6 they form the grooves 31. The finished plug can slide off the pin 62. The bottom of the mould is closed by end pin 64.

Two pegs 66, 68 are formed in each mould part 52, 54 respectively. The pegs project obliquely downwards (in FIG. 13) into the cavity between the mould parts. They lie adjacent each other in said first plane 56, each having a first surface 66a, 68a respectively abutting one another. Each pin 62, 64 is shaped at its end to abut the pegs 66, 68 without leaving any gaps between them. Thus the bore pin 62 has a step 70 in the first plane 56 between a first shoulder 72 abutting top edge 74 of peg 68 and a second shoulder 76 abutting top edge 78 of the peg 66. Similarly the end pin 64 has a step 80 in the first plane 56 between a first ledge 82 abutting bottom edge 84 of peg 68 and a second ledge 86 abutting bottom edge 88 of the peg 66. The shoulders 72, 76 and ledges 82, 86 are sloped to correspond with the slopes of the pegs 66, 68.

Their mating first surfaces 66a, 68a are flat and smooth, but the pegs 66, 68 each have second surfaces 66b, 68b. The second surfaces 66b, 68b commence at roots 65 of each peg and are at this point substantially parallel to first plane 56. However, after passing through the second plane 58 towards a distal end 67 of each peg, the second surfaces change direction gradually until they end substantially parallel the second plane 58. The thickness R of each peg is equal to the radius (allowing for shrinkage) of the shank of a screw intended to be received in the plug. The radius of curvature of the end of each peg is also equal to R. On the second surface 66b, 68b are formed ridges 90. Between the roots 65 and the second plane 58, the ridges 90 are parallel the top and bottom edges 78, 88 and 74, 84 of pegs 66, 68 respectively. However, as the ridges 90 curve around the end 67 they turn downwards.

The pins 62, 64 have a general diameter equal to that of the bore 14 (again, allowing for shrinkage) of the finished plug. However, at their ends they are provided with an oblique helical land 92, 94 of one turn adjacent their respective ends.

The start and finish of each land 92, 94 is in said first plane 56 so that here there is a further step 96 in each pin.

The nett result of this is that a thread formation can be moulded. The thread commences, for example, at step 96 of the end pin 64, (this is at point A in FIG. 12). The thread is formed here between the land 94 and lowest ridge 90 of the peg 66. After about one third of a turn (point C) the thread begins to be lost (in the sense of being on the circle of radius between R and S) as it enters the peg 66, but it restarts after passing through the first plane (point D) between the land 94 and the lowest ridge 90 of the peg 68. Again after about one third of a turn (point F) the thread is lost as it enters the peg 68 but again it restarts beyond the first plane 56 (point A again), but this time between the lowest ridge 90 of the peg 66 and the next ridge. The thread progresses initially up the upwardly curved portion of the ridges 90 (to point B) before proceeding further up the straight but obliquely disposed parts of the ridges 90. However, the thread is lost again at point C but again restarts between ridges 90 on the peg 68.

We have found two ridges 90 to be sufficient, but clearly more are feasible.

Finally, the thread restarts at A again below step 96, after having been lost on passing through peg 68, between top ridge 90 of peg 66 and the land 92 on the pin 62. At point C the thread continues uninterrupted around the end of the peg 68 and between the topmost ridge 90 thereon and the land 92 continuing round the pin 62 until the thread ends at step 96 of the pin 62. Thus the thread so formed is of three turns, but two of the turns each have about one third missing as a result of the pegs passing through them. Moreover, the pegs form a slot 19 on either side of the tail portion 10 of the plug, which inevitably has a weakening effect but both deficiencies are a small price to pay in return for a quite satisfactory thread formation.

When the mould 50 is assembled, plastic material is injected in a known way and allowed to harden. The mould is separated first by withdrawing the end pin 64 but followed closely by mutual separation of the mould parts 52, 54.

The direction of separation can in each case be that of the pegs 66, 68 so that the plug is left on the pin 62 from which it can subsequently be ejected. However, the pegs 66, 68 can act also as ejector pins if the parts 52 are separated in said first plane in directions perpendicular to the second plane.

As the pegs 66, 68 are then drawn out of the slots 19, they drive the plug downwards off the pin 62.

Thus a screw (not shown) of shank diameter R and thread diameter S (allowing, of course, for shrinkage) and having a thread pitch equal to the separation of the ridges 90 and the lands 92, 94 above and below, is capable of being driven into the tail portion 10 of the plug substantially without having to cut any thread itself. This means that the lands 16 can, in fact, be close to the screw so that a particularly strong connection to the screw is possible, even with some parts of the thread missing.

Because it does not have to cut its own thread, there is little resistance to a screw being driven and so the advantages for the plug as mentioned above are realist. At the same time however, the unit cost of manufacture of the plug with this thread formation is not increased by any significant amount. Indeed multiple plugs can be moulded simultaneously if the mould 50 is arranged with multiple cavities and pins, each as shown in the drawings.

Although the aforementioned thread formation is designed as near to a perfect helix as possible, it should be appreciated that, being constructed from nylon, it can be allowed that the thread formation be only an approximation of a helix. Thus to aid withdrawal of the pins 66, 68, they could have first and second parts of the sides 66b, 68 which are straight and not curved as shown, the second part being substantially parallel said second plane 58 while the first part is parallel the first plane 56. Alternatively, the grooves could be tapered somewhat from root to distal end, or could be shallower. Indeed, the fact that nylon or a like material is used allows some cutting of the bore to be permitted without departing from the essence of the present invention. Indeed, screws of even the wrong dimensions can still be used to good effect, although this is not of course preferred.

What is claimed is:

1. A plug for use in securing a screw in a previously formed hole in a work piece comprising a head portion, a tail portion of substantially the same external diameter as the head portion, and legs interconnecting the tail portion and the head portion, wherein the tail portion comprises a body having a central bore from a leg end to an opposite open end, said leg end being connected to said legs, a first helical land of at most one turn being formed in said bore near said leg end, a second helical land of at most one turn being formed in said bore near said open end, each helical land having a start and an end being in a first plane containing a central longitudinal axis of the plug, inclined arcuate grooves being formed in said bore between said lands, and two openings in either side of said cylindrical portion connecting with said bore, each opening having a first side coincident with said plane and a second parallel side on opposite sides of said plane, a second plane being defined by said axis and lying perpendicular said first plane, said second sides of each opening each having a profile the same as the profile in said second plane of said grooves in the bore, said helical lands and said arcuate grooves constituting a thread formation such that a screw of appropriate dimensions can drive through said formation substantially without cutting the material of the plug.

2. A plug according to claim 1, wherein there are two arcuate grooves extending between said second side of said openings in a direction parallel said first plane until said second plane is reached whereupon said grooves curve until they are substantially parallel said first plane and terminate at the other opening.

3. A plug according to claim 2, wherein the grooves curve in said first plane as well as in a plane perpendicular said first and second planes.

4. A plug according to claim 2, wherein said grooves between the second side of each opening and said second plane are substantially straight and deflected obliquely downwards in a plane parallel said first plane.

5. A plug according to claim 1, wherein the width of said openings is equal to the radius of said bore.

* * * * *